United States Patent
Tsutsui et al.

(10) Patent No.: US 9,570,045 B2
(45) Date of Patent: Feb. 14, 2017

(54) TERMINAL APPARATUS AND DISPLAY CONTROL METHOD

(75) Inventors: Makiko Tsutsui, Kawasaki (JP); Hideaki Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 310 days.

(21) Appl. No.: 12/558,684

(22) Filed: Sep. 14, 2009

(65) Prior Publication Data
US 2010/0070915 A1 Mar. 18, 2010

(30) Foreign Application Priority Data
Sep. 16, 2008 (JP) .................................. 2008-237106

(51) Int. Cl.
*G09G 5/14* (2006.01)
*G06F 3/0488* (2013.01)
(Continued)

(52) U.S. Cl.
CPC ............... *G09G 5/14* (2013.01); *G06F 3/0488* (2013.01); *G06F 3/0485* (2013.01);
(Continued)

(58) Field of Classification Search
USPC ................................................ 715/800, 863
See application file for complete search history.

(56) References Cited

U.S. PATENT DOCUMENTS 4,914,624 A * 4/1990 Dunthorn ....................... 345/173
5,867,156 A * 2/1999 Beard .................... G06F 3/0481
715/753

(Continued)

FOREIGN PATENT DOCUMENTS

JP H09-050483 A 2/1997
JP 10-063257 3/1998
(Continued)

OTHER PUBLICATIONS

Japanese Office Action mailed Apr. 30, 2013 for corresponding Japanese Application No. 2008-237106, with Partial English-language Translation.
(Continued)

*Primary Examiner* — Jeffrey A Gaffin
*Assistant Examiner* — John M Heffington
(74) *Attorney, Agent, or Firm* — Fujitsu Patent Center (57) ABSTRACT

A terminal apparatus includes a display, a display control unit configured to display a screen on the display in a given display mode, a first selection operation detection unit configured to detect that a first selection operation concerning the given display mode has been performed in a given area of the screen, and a second selection operation detection unit configured to detect that a second selection operation concerning given processing has been performed in the given area of the screen. The display control unit displays a screen by changing to a second display mode based on detection of the first selection operation in the screen displayed in a first display mode, performs the given processing based on detection of the second selection operation, and performs display control processing for displaying a screen in the first display mode after the given processing.

18 Claims, 6 Drawing Sheets

(51) Int. Cl.
*G06F 3/0485* (2013.01)
*H04M 1/725* (2006.01)

(52) U.S. Cl.
CPC .............. *G06F 2203/04806* (2013.01); *G06F 2203/04808* (2013.01); *G09G 2340/0407* (2013.01); *G09G 2370/027* (2013.01); *H04M 1/72561* (2013.01); *H04M 2250/22* (2013.01)

(56) References Cited

U.S. PATENT DOCUMENTS

| | | | |
|---|---|---|---|
| 6,044,385 A * | 3/2000 | Gross ................ | G06F 17/30716 345/427 |
| 6,161,114 A * | 12/2000 | King ................... | G06F 17/211 707/E17.121 |
| 6,185,589 B1 | 2/2001 | Votipka ............... | G06F 17/245 715/205 |
| 6,271,840 B1 * | 8/2001 | Finseth ............ | G06F 17/30864 707/E17.108 |
| 6,310,610 B1 * | 10/2001 | Beaton et al. ................ | 345/173 |
| 6,359,632 B1 * | 3/2002 | Eastty et al. ................ | 715/716 |
| 6,456,305 B1 * | 9/2002 | Qureshi ............ | G06F 17/30905 707/E17.121 |
| 6,703,999 B1 * | 3/2004 | Iwanami et al. ............... | 345/158 |
| 6,708,309 B1 * | 3/2004 | Blumberg ............ | H04N 1/2183 382/305 |
| 6,710,771 B1 * | 3/2004 | Yamaguchi et al. ........... | 345/184 |
| 6,760,020 B1 * | 7/2004 | Uchiyama et al. ............ | 345/419 |
| 6,798,768 B1 * | 9/2004 | Gallick et al. ................ | 370/352 |
| 6,826,727 B1 * | 11/2004 | Mohr ................... | G06F 17/211 382/180 |
| 6,882,641 B1 * | 4/2005 | Gallick et al. ................ | 370/356 |
| 6,954,583 B2 * | 10/2005 | Nagasaka et al. ............ | 386/243 |
| 7,100,105 B1 * | 8/2006 | Nishimura et al. ........... | 715/209 |
| 7,143,355 B2 * | 11/2006 | Yamaguchi et al. .......... | 715/733 |
| 7,242,311 B2 * | 7/2007 | Hoff et al. .................... | 340/679 |
| 7,320,112 B2 * | 1/2008 | Yamaguchi et al. .......... | 715/831 |
| 7,515,810 B2 * | 4/2009 | Nagasaka et al. ............ | 386/248 |
| 7,796,837 B2 * | 9/2010 | Lueck ............... | G06F 17/30905 382/173 |
| 7,898,281 B2 * | 3/2011 | Andrews et al. ......... | 324/762.05 |
| 8,201,109 B2 * | 6/2012 | Van Os ................. | G06F 3/0488 715/710 |
| 8,302,029 B2 * | 10/2012 | Makela .......... | 715/800 |
| 8,407,606 B1 * | 3/2013 | Davidson et al. ............. | 715/754 |
| 8,429,567 B2 * | 4/2013 | Davidson ....................... | 715/863 |
| 8,782,551 B1 * | 7/2014 | Bartelma ................. | G06F 3/048 715/776 |
| 9,128,596 B2 * | 9/2015 | Oygard ................. | G06F 3/0485 |
| 2001/0026678 A1 * | 10/2001 | Nagasaka et al. .............. | 386/70 |
| 2002/0196238 A1 * | 12/2002 | Tsukada et al. .............. | 345/173 |
| 2003/0095135 A1 * | 5/2003 | Kaasila et al. ................ | 345/613 |
| 2003/0137522 A1 * | 7/2003 | Kaasila et al. ................ | 345/619 |
| 2003/0214671 A1 * | 11/2003 | Bos et al. ...................... | 358/1.15 |
| 2004/0150668 A1 * | 8/2004 | Myers et al. .................. | 345/771 |
| 2004/0268283 A1 * | 12/2004 | Perry .................. | G06F 17/5045 716/119 |
| 2005/0116941 A1 * | 6/2005 | Wallington .................... | 345/184 |
| 2005/0134578 A1 * | 6/2005 | Chambers et al. ........... | 345/184 |
| 2006/0026535 A1 * | 2/2006 | Hotelling et al. ............. | 715/863 |
| 2007/0236475 A1 * | 10/2007 | Wherry ......................... | 345/173 |
| 2009/0199130 A1 * | 8/2009 | Tsern ..................... | G04G 21/08 715/810 |
| 2009/0225037 A1 * | 9/2009 | Williamson ........ | G06F 3/04883 345/173 |
| 2010/0169819 A1 * | 7/2010 | Bestle ................. | G06F 3/04883 715/773 |
| 2011/0001753 A1 * | 1/2011 | Frej et al. ...................... | 345/536 |
| 2012/0130308 A1 * | 5/2012 | Silkaitis et al. .............. | 604/151 |
| 2012/0136702 A1 * | 5/2012 | Fajkowski .................. | 705/14.13 |
| 2012/0260220 A1 * | 10/2012 | Griffin .......................... | 715/863 |
| 2013/0174100 A1 * | 7/2013 | Seymour et al. .............. | 715/863 |
| 2013/0179831 A1 * | 7/2013 | Izaki ............................. | 715/800 |

FOREIGN PATENT DOCUMENTS

| | | |
|---|---|---|
| JP | 2001-22496 A | 1/2001 |
| JP | 2001-242981 A | 9/2001 |
| JP | 2004-280745 A | 10/2004 |
| JP | 2008-146135 A | 6/2008 |

OTHER PUBLICATIONS

English-language partial translation of Office Action (hereinabove "JPOA") mailed by the Japan Patent Office on Jan. 14 2014, in connection with foreign priority Japanese Patent Application No. 2008-237106.

Nobuyuki Hayashi et al.,"iPod touch (old model) [Safari] Web page wo miruniha—Dekiru Net Plus + (Dekiru Net Plus)", [online], Impress Japan Corporation, Nov. 29, 2007, [searched on Sep. 24, 2013], URL, http://dekiru.impress.co.jp/contents/007/00710.htm.

Japanese Office Action mailed Aug. 28, 2012 for corresponding Japanese Application No. 2008-237106, with Partial English-language Translation.

* cited by examiner

(a) 100% DOUBLE TAP

| ■ BASIC KNOWLEDGE ABOUT PC | FOR THOSE WHO USE A PERSONAL COMPUTER FOR THE FIRST TIME, THE BASICS OF MAIL/THE INTERNET ... [PERSONAL COMPUTER UTILIZATION QUIZ BY MASTER] [PERSONAL COMPUTER EXPLANATION SKILL QUIZ] [PERSONAL COMPUTER CONSULTATION] [VIRUS/SECURITY INFORM] [THE ART OF INTERNET UTILIZATION] |
|---|---|
| ■ IMPROVE YOUR SKILLS | FREE MAIL PERSONAL COMPUTER COURSE AND TYPING ARE OFFERED TO IMPROVE YOUR SKILLS [DRILLS TO MASTER HOW TO USE PERSONAL COMPUTER] [NG TRAINING] [SCHOOL INFORMATION] |
| ■ MASTER HOW TO USE MOBILE PHONE | RICH SERVICES IN COMBINATION WITH YOUR PERSONAL PUTER TO MAKE YOUR MOBILE PHONE ENJOYABLE [USEFUL INFORMATION] [WALLPAPER DOWNLOAD] [APP TIONS DOWNLOAD] |

SINGLE TAP OF LINK

DOUBLE TAP (b) 200%

| ■ BASIC KNOWLEDGE ABOUT PC | FOR THOSE WHO FIRST TIME, THE B [PERSONAL COMP [PERSONAL COMP COMPUTER CONS [THE ART OF INTE |
|---|---|
| ■ IMPROVE YOUR SKILLS | FREE MAIL PERSO ARE OFFERED TO |

SINGLE TAP OF LINK

DOUBLE TAP (c) 400%

■ BASIC KNOWLEDGE A

SINGLE TAP OF LINK (d) 100%

>AzbyClub >MASTER HOW TO USE

| PRODUCT | SUPPORT | MASTER HOW TO USE | SHOPPING | MY PAGE |

| MASTER HOW TO USE FMV | BASIC KNOWLEDGE ABOUT PC | IMPROVE YOUR SKILLS | MASTER HOW TO USE MOBILE PHONE |

WE TEACH THOSE WHO USE A PERSONAL COMPUTER FOR THE FIRST TIME HOW TO USE THE KEYBOARD AND THE BASICS OF MAIL/THE INTERNET.

WHAT'S NEW

■ CAN PROGRAMS OF TERRESTRIAL DIGITAL BROADCASTING BE COPIED 10 TIMES?

DUBBING 10 — WITH "DUBBING 10", PROGRAMS OF TERRESTRIAL DIGITAL BROADCASTING CAN NOW BE COPIED, AS THE NAME IMPLIES,

FIG. 5

TERMINAL APPARATUS AND DISPLAY CONTROL METHOD

CROSS-REFERENCE TO RELATED APPLICATION

This application is based upon and claims the benefit of priority of the prior Japanese Patent Application No. 2008-237106, filed on Sep. 16, 2008, the entire contents of which are incorporated herein by reference.

FIELD

Embodiments of the present invention relate to a technology to control a display mode of a screen displayed on a display of a terminal apparatus.

BACKGROUND

In a mobile terminal apparatus such as a mobile phone and PDA (Personal Digital Assistants), the display is increasingly becoming smaller in recent years due to miniaturization, leading to a limited display area. Also in a terminal apparatus other than a mobile terminal apparatus such as a PC (Personal Computer), for displaying as much information as possible by, for example, arranging a plurality of windows on the display, each window may become smaller, leading to a limited display area for each window. When a screen is displayed in such a display area, display sizes of characters and images in the screen become smaller if the whole screen is made a display area so that the screen may be viewed more easily. If the display size becomes smaller, it becomes more difficult to select and operate a button, icon, hyper-link and the like arranged in the screen. Particularly when a touch panel is used as the display and a user performs a selection operation on the touch panel using a finger, it is difficult to finely specify the position.

Further, a mobile phone generally has a Web browser to view Web sites created for PCs mounted therein. In the Web browser, for example, a screen of a Web site created by assuming a mouse operation on a PC is displayed in a display area of the mobile phone. Thus, when a screen created with a layout by assuming a different display area is displayed, hyperlinks and the like in the screen are frequently positioned or have a display size inappropriate for selection operation.

In response to such a problem, an apparatus that enables the user to change the display scaling factor of the screen so that the user may perform a selection operation after the screen is displayed by being scaled up is proposed (see, for example, Japanese Patent Application Laid-Open No. 2001-242981). In a flat coordinate input apparatus according to Patent Document 1, a tap operation and input coordinates thereof are detected through a flat coordinate input means. Then, the vicinity of the display position corresponding to the input coordinates is displayed by being scaled up in response to an odd tap operation and displayed by being scaled down to return to the original display scaling factor in response to an even tap operation.

However, the above apparatus is caused to change the display mode simply by the display scaling factor being successively specified through a tap operation. In contrast, for example, when a Web site is viewed via the Web browser of a mobile phone, screen transitions frequently occur because the user follows hyperlinks and the like. If the display scaling factor appropriate for selection operation and that appropriate for viewing are successively specified, there is a problem that operations become complicated and user convenience is reduced. This problem may also arise in devices other than the mobile phone.

SUMMARY

According to an aspect of the embodiments discussed herein, a terminal apparatus includes a display, a display control unit configured to perform display control processing for displaying a screen on the display in a given display mode, a first selection operation detection unit configured to detect that a first selection operation concerning the given display mode has been performed in a given area of the screen, and a second selection operation detection unit configured to detect that a second selection operation concerning given processing has been performed in the given area of the screen. The display control unit performs display control processing for displaying a screen by changing to a second display mode based on detection of the first selection operation in the screen displayed in a first display mode, performs the given processing based on detection of the second selection operation, and performs display control processing for displaying a screen in the first display mode after the given processing.

It is to be understood that both the foregoing general description and the following detailed description are exemplary and explanatory and are not restrictive of the embodiments, as claimed.

BRIEF DESCRIPTION OF DRAWINGS

FIG. 4 is a diagram exemplifying a display mode of a screen of the mobile phone in FIG. 1;

DESCRIPTION OF EMBODIMENTS

First Embodiment

The first embodiment of the disclosed terminal apparatus and display control method will be described with reference to FIG. 1 to FIG. 4. A mobile phone 1, which is an embodiment of the disclosed terminal apparatus, has a phone function, a mail transmission/reception function, and a browser function that displays a site on the Internet in a screen by radio communication with an external center. The mobile phone 1 has, as a browser function, a Web browser that displays Web pages of Web sites created for PCs other than sites created for mobile phones (see FIG. 4 described below).

Figure 1:
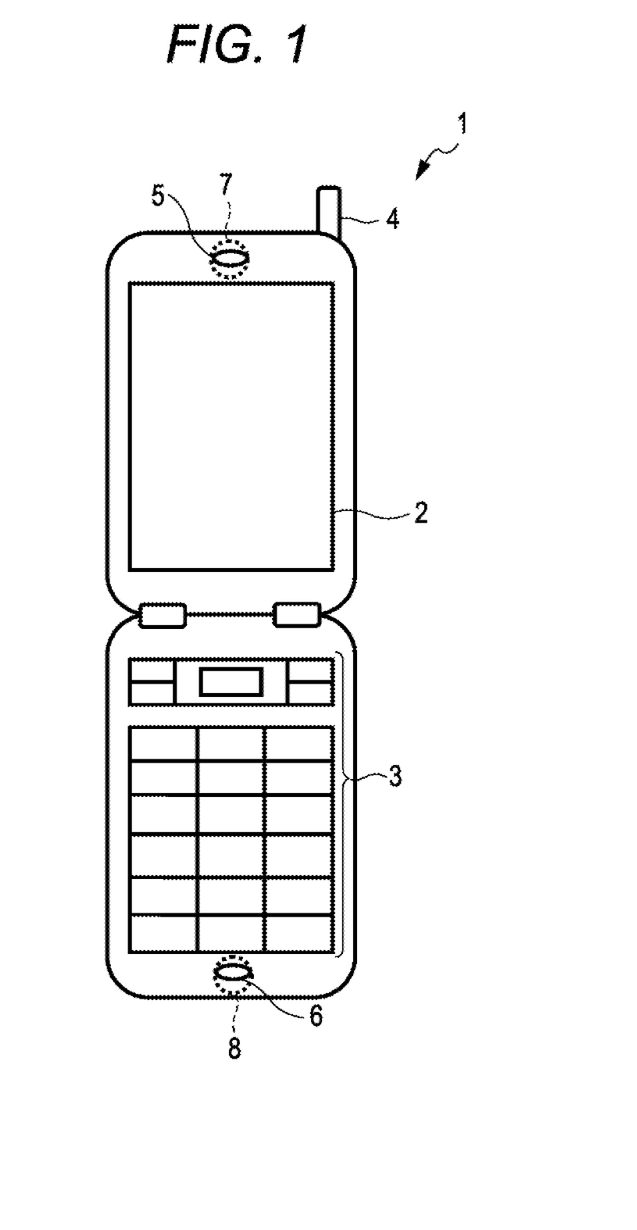
FIG. 1 is an external view illustrating a display of a mobile phone according to a first embodiment of a disclosed terminal apparatus.

As illustrated in FIG. 1, the mobile phone 1 has a display 2, a keypad 3, an antenna 4, an earpiece 5, and a mouthpiece 6 arranged therein; and a speaker 7 is arranged inside the earpiece 5, and a microphone 8 is arranged inside the mouthpiece 6. The keypad 3 has, for example, as a plurality of key switches for input, a menu key, scroll key, power key, start key, clear key, cursor key, character keys and the like arranged therein.

The display 2 has both a display function and an input function and, for example, an LCD (Liquid Crystal Display) integrated touch panel may be used as the display 2. The display 2 is used to present information and to display a cursor for selection operation. The touch panel of the display 2 is, for example, a pressure-sensitive or capacitance-type touch panel and accepts touch input (such as a tap operation) by, for example, a finger of the user. ON/OFF of touch input and the position thereof are output as input information. In addition to input by a finger, touch input using an input means such as a stylus may also be possible. However, it is inconvenient to carry an input means such as a stylus together with a mobile terminal apparatus such as a mobile phone and thus user convenience is enhanced by enabling touch input by a finger of the user.

When a Web browser is executed in the mobile phone 1, a Web page is displayed as a screen in the display 2 in the display scaling factor for viewing preset by the user. If a double tap operation is detected by the touch panel, the display scaling factor is changed to the temporary display scaling factor for selection operation and the screen of the Web page is redisplayed. If a hyperlink is selected in the screen of the touch panel, a Web page linked by the hyperlink is displayed in the screen of the display 2 in the display scaling factor for viewing. A hyperlink is location information (such as a URL) of another Web page or the like embedded in a Web page and the hyperlink is selected by a single tap operation being performed in an area where the hyperlink is set in the screen.

Figure 2:
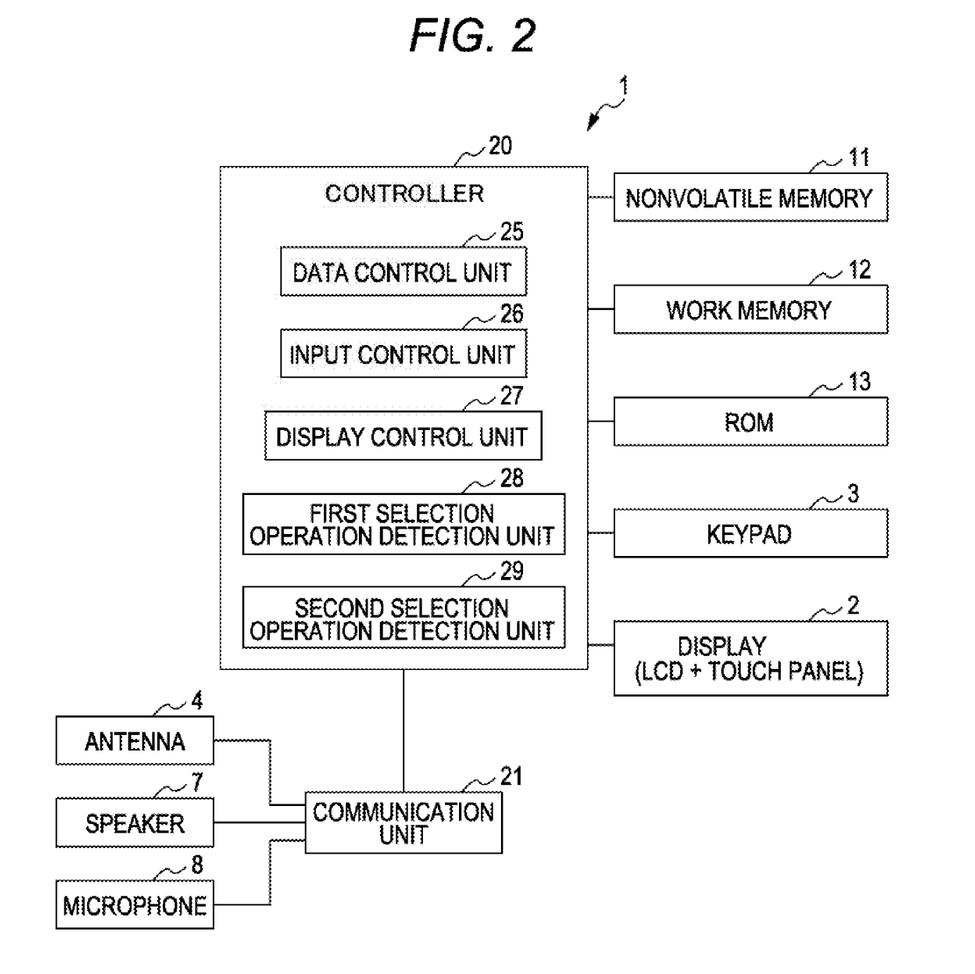
FIG. 2 is a functional block diagram illustrating a configuration of the mobile phone in FIG. 1.

As illustrated in FIG. 2, the mobile phone 1 has an electronic unit including memories (a nonvolatile memory 11, a work memory 12, and a ROM (Read Only Memory) 13) and a CPU (Central Processing Unit) and has a controller 20 as functions thereof. The display 2 and the keypad 3 are connected to the controller 20. Further, the controller 20 is connected to the antenna 4, the speaker 7, and the microphone 8 via a communication unit 21. The communication unit 21 has a radio unit for transmitting and receiving a high-frequency signal and a signal processing unit for performing signal processing of sound and data to transmit and receive a signal to and from a center by radio.

Registered data such as phone numbers and mail addresses, data of transmitted and received mail, and setting data used for various functions of the mobile phone 1 are stored in the nonvolatile memory 11. As setting data, candidate values of setting data that may be used in the mobile phone 1 specified as hardware and setting values (if not selected, default values) selected by the user from the candidate values of setting data are stored. Setting data includes display parameters when a Web page is displayed in the screen of the display 2. Display parameters include a display scaling factor A, display reference position C, display area size, and character size.

Regarding the display scaling factor, for example, n (n=1, 2 . . . ) display scaling factors A1 to An are stored as candidate values that may be used in the mobile phone 1. Then, when a display scaling factor setting function is selected from a menu screen of the mobile phone 1 by the user, a display scaling factor setting screen is displayed in the display 2 and the candidate values A1 to An of the display scaling factor are selectably presented. The display scaling factor selected from the candidate values A1 to An by the user is stored in the nonvolatile memory 11 as the set display scaling factor A.

Temporary data for performing processing by the controller 20 is stored in the work memory 12. When, for example, a Web browser is executed, page data of a Web page acquired via the Internet, input information of the touch panel, a screen to be displayed created by rendering a Web page using the display parameters, or the display parameters currently being used (such as a display scaling factor X and a display reference position Y) are temporarily stored. As described below, the display scaling factor A stored in the nonvolatile memory 11 or a temporary display scaling factor B specified by the user is set as the display scaling factor X.

The controller 20 performs various kinds of processing such as call control, mail transmission and reception control, and Web browser execution and has a data control unit 25 and an input control unit 26 as functions thereof. The data control unit 25 performs write and read operations of registered data, mail data, and setting data to and from the nonvolatile memory 11. When a key switch of the keypad 3 is operated by being pressed, the input control unit 26 accepts the operation input and performs processing accordingly.

Further, the controller 20 has a display control unit 27 that creates a screen to be displayed in the display 2 and causes the display 2 to display the created screen. The display control unit 27 creates a screen to be displayed in the display 2 by rendering data using display parameters stored in the nonvolatile memory 11 or those specified by the user. For example, when the Web browser is executed, the display control unit creates a screen to be displayed by rendering page data of a Web page acquired through communication using the display scaling factor X.

Further, the controller 20 has a function to detect the type of touch input operation based on input information from the touch panel. For example, the controller 20 detects the type of operation (the single tap operation, double tap operation, and otherwise) from the duration and count of the ON state of a touch input. The controller 20 has a first selection operation detection unit 28 that detects that a first selection operation concerning the display mode has been performed in a given area in the screen and a second selection operation detection unit 29 that detects that a selection operation concerning given processing has been performed in a given area in the screen. In the present embodiment, the first selection operation detection unit 28 detects that, when the screen of a Web page is displayed in the display 2 by the Web browser, a double tap operation is performed in an area excluding hyperlinks of the Web page on the touch panel of the display 2. The second selection operation detection unit 29 detects that, when the screen of a Web page is displayed in the display 2 by the Web browser, a hyperlink of the Web page is selected (a single tap operation is performed in an area where a hyperlink is set) by a single tap operation on the touch panel of the display 2. The given processing corresponds to processing to acquire data of a Web page linked by a hyperlink through communication and to display the Web page in the screen.

Then, the display control unit 27 causes the display 2 to redisplay the screen by changing to a second display mode based on detection of a first selection operation in the screen displayed in first display mode. The display control unit 27 performs the given processing based on detection of a second selection operation and causes the display 2 to display the screen after the processing in the first display mode.

In the present embodiment, if a double tap operation is detected in the screen during execution of the Web browser, the display control unit 27 changes the display scaling factor of the screen. If a double tap operation is detected in the screen of a Web page displayed in the display scaling factor A preset by the user as the display scaling factor for viewing and stored in the nonvolatile memory 11, the display control unit 27 causes the display 2 to redisplay by changing to the temporary display scaling factor B for selection operation. In the present embodiment, m (m=1, 2 . . . ) temporary display scaling factors B1 to Bm are provided as temporary display scaling factors B. Then, each time a double tap operation is detected, either the display scaling factor A or one of the display scaling factors B1 to Bm is sequentially set as the display scaling factor X. If a hyperlink is selected by a single tap operation in the screen of a Web page displayed in the display scaling factor A or B during execution of the Web browser, the display control unit 27 causes the display 2 to display the screen of a Web page linked by a hyperlink in the display scaling factor A.

Functions of the controller 20 are realized by causing a CPU (corresponding to a computer used by a program having a disclosed display function) of the mobile phone 1 to execute programs stored in the ROM 13. The programs include the program having the disclosed display function.

Next, an operation (display control processing) of the mobile phone 1 in the present embodiment will be described with reference to the flowchart in FIG. 3. It is assumed in the initial state that the mobile phone 1 is turned on, the Web browser is activated, and page data of a Web page is acquired through the Internet. Also, an example of the display mode of the screen illustrated in FIG. 4 will be referenced below when appropriate. In the example in FIG. 4, 100[%] is set as the display scaling factor A for viewing. Also, two stages of display scaling factors B1 and B2 (B1=200[%], B2=400[%]) for selection operation are set as the temporary display scaling factor B for selection operation. The display scaling factor 400[%] corresponds to the upper limit of the display scaling factor that may be displayed in the mobile phone 1. Broken line arrows in FIG. 4 indicate that a double tap operation is performed while the screen of a Web page is displayed to sequentially switch the display scaling factor X of the screen of the Web page (toggled from the starting point of the display scaling factor A for viewing preset by the user) (FIG. 4(a) to FIG. 4(c)). Solid line arrows in FIG. 4 indicate that a hyperlink is selected by a single tap operation while the screen of a Web page is displayed to display the screen of a Web page linked by the hyperlink in the screen in the display scaling factor A for viewing preset by the user (FIG. 4 (d)).

Figure 3:
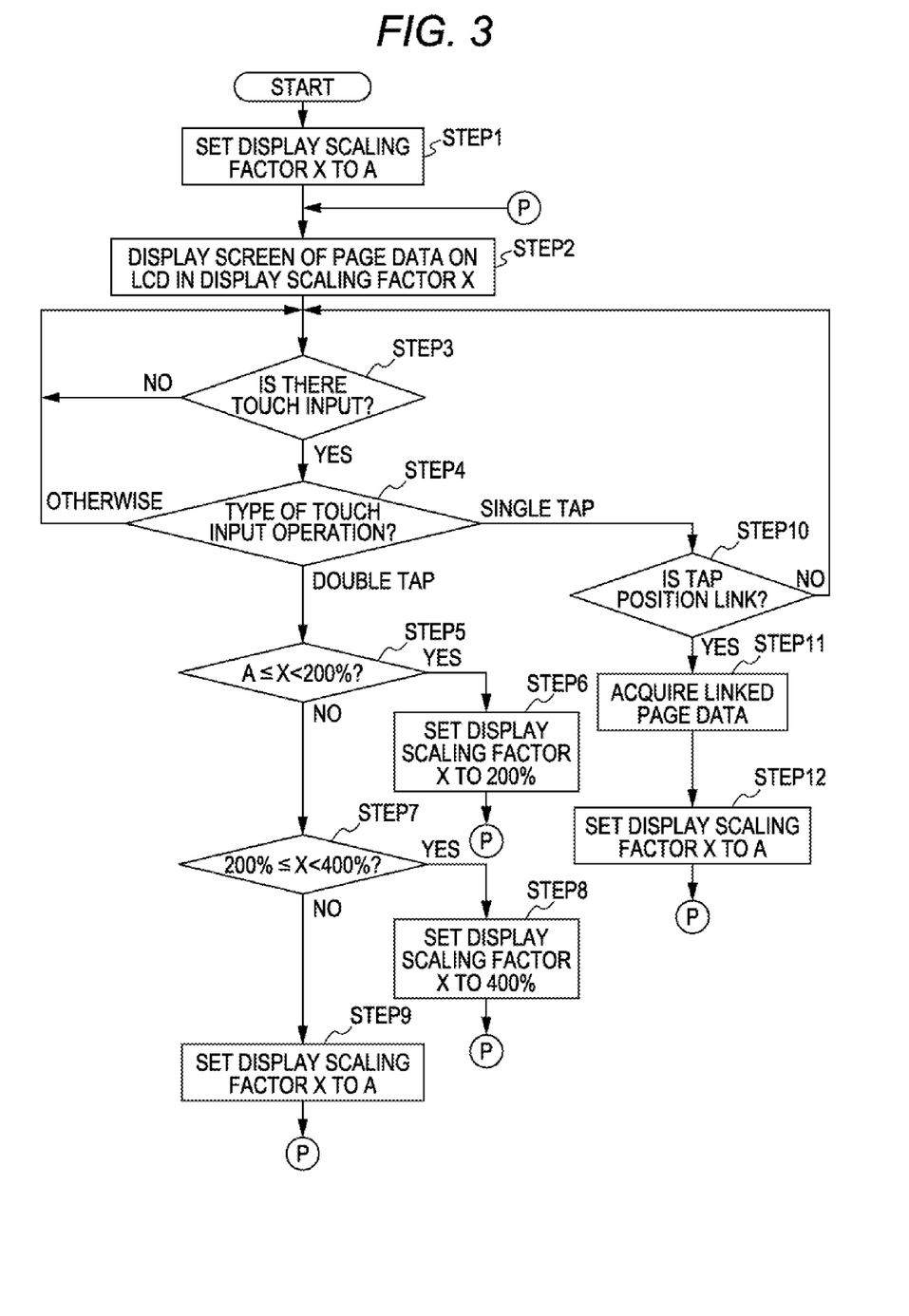
FIG. 3 is a flowchart illustrating display control processing in the mobile phone in FIG. 1.

FIG. 3 will be referenced. First at STEP 1, the controller 20 reads the preset display scaling factor A from the nonvolatile memory 11 and sets the display scaling factor A as the display scaling factor X.

Next, at STEP 2, the controller 20 displays the acquired Web page in the screen of the display 2 in the scaling factor X (=A). The controller 20 creates a screen to be displayed by rendering page data of a Web page using the display scaling factor X and other display parameters stored in the nonvolatile memory 11 and displays the created screen in the display 2. Accordingly, if, for example, 100[%] is set as the display scaling factor A, as illustrated in FIG. 4(a), the Web page is displayed in the LCD screen of the display 2 in the display scaling factor 100[%].

Next, at STEP 3, the controller 20 determines whether any touch input has been done on the touch panel of the display 2 based on input information from the touch panel of the display 2. If the determination result at STEP 3 is NO, STEP 3 is repeated until the determination result at STEP 3 becomes YES, putting the touch panel into an input wait state.

If the determination result at STEP 3 is YES, the controller 20 proceeds to STEP 4 to determine the type of operation of touch input based on input information from the touch panel of the display 2. For example, the type of operation (whether a single tap operation, a double tap operation, or otherwise) is determined from the time during which the ON state continues and the number of times thereof. If, as a result of determination at STEP 3, the type of operation is determined to be neither single tap nor double tap, the controller 20 returns to STEP 3 to wait for input of the touch panel.

If, as a result of determination at STEP 4, the type of operation is determined to be a double tap operation, the controller 20 proceeds to STEP 5 to determine whether the currently set display scaling factor X is A≤X<200[%]. If the determination result at STEP 5 is YES, the controller 20 proceeds to STEP 6 to set the display scaling factor X to 200[%] before returning to STEP 2. Accordingly, the Web page will be displayed by being scaled up in the display scaling factor of 200[%], making a selection operation easier.

If the determination result at STEP 5 is NO, the controller 20 proceeds to STEP 7 to determine whether the currently set display scaling factor X is 200[%]≤X<400[%]. If the determination result at STEP 7 is YES, the controller 20 proceeds to STEP 8 to set the display scaling factor X to 400[%] before returning to STEP 2. Accordingly, the Web page will be displayed by being scaled up in the display scaling factor of 400[%], making a selection operation easier.

If the determination result at STEP 7 is NO, the controller 20 proceeds to STEP 9 to set A to the display scaling factor X before returning to STEP 2.

With the processing at STEPS 5 to 9 described above, (1) if the display scaling factor A is A<200[%], the display scaling factor X is sequentially changed such that "A→200[%]→400[%]→A . . . " each time a double tap operation is performed. (2) If the display scaling factor A is 200[%]≤A<400[%], the display scaling factor X is sequentially changed such that "A→400[%]→A . . . " each time a double tap operation is performed. (3) If the display scaling factor A is 400[%], even if a double tap operation is detected, the display scaling factor remains unchanged: "400[%]→400[%] . . . ".

Accordingly, the display scaling factor X, which is equal to or larger than the display scaling factor A set by the user, is set for scaled-up displaying within a range specified as hardware.

Then, at STEP 2, the controller 20 redisplays the acquired Web page in the display scaling factor X using the input position of the double tap operation as a reference position. Accordingly, if, for example, a double tap operation is performed in the screen displayed in the display scaling factor of 100[%] exemplified in FIG. 4(a), the display scaling factor X is set to 200[%] at STEP 6 and, as illustrated in FIG. 4(b), the Web page is redisplayed in the display scaling factor of 200[%]. Accordingly, a hyperlink may be selected in the screen displayed by being scaled-up to 200[%], making a selection operation easier. If a double tap operation is performed in the screen displayed in the display scaling factor of 200[%] exemplified in FIG. 4(b), the display scaling factor X is set to 400[%] at STEP 8 and, as illustrated in FIG. 4(c), the Web page is redisplayed in the display scaling factor of 400[%]. Accordingly, a hyperlink may be selected in the screen displayed by being scaled-up further to 400[%], making a selection operation easier. If a double tap operation is performed in the screen displayed in the display scaling factor of 400[%] exemplified in FIG. 4(c), the display scaling factor X is set to 100[%] at STEP 9 and, as illustrated in FIG. 4(a), the Web page is redisplayed in the display scaling factor of 100[%]. Accordingly, if, for example, viewing of the displayed Web page may be continued by stopping a selection operation, the display scaling factor X may be brought back to the display scaling factor A for viewing.

On the other hand, if, as a result of determination at STEP 4, the type of operation is determined to be a single tap operation, the controller 20 proceeds to STEP 10 to determine whether a hyperlink in the screen is selected by the single tap operation. That is, the controller 20 determines whether the input position of the single tap operation is included in an area where the hyperlink is set in the screen. If the determination result at STEP 10 is NO, the controller 20 returns to STEP 3 to wait for input of the touch panel.

If the determination result at STEP 10 is YES, the controller 20 proceeds to STEP 11 to acquire page data of a Web page linked by the hyperlink. Next, the controller 20 sets the display scaling factor X to A before returning to STEP 2.

Then, at STEP 2, the controller 20 displays the Web page linked by the hyperlink in the display scaling factor A. Accordingly, when a transition to another Web page occurs by selecting a hyperlink, the screen of the Web page after the transition is displayed in the display scaling factor A preset for viewing by the user. Thus, the screen may be viewed swiftly to grasp the content thereof without performing any other operation. For example, in the example illustrated in FIGS. 4(a) to 4(c), regardless of whether the display scaling factor X when a hyperlink is selected is 100[%], 200[%], or 400[%], the screen of the Web page after the transition is displayed in the display scaling factor 100[%] preset for viewing by the user.

The above is the display control processing performed by the mobile phone 1 in the present embodiment. STEPS 3 and 4 correspond to processing by the first selection operation detection unit 28, STEPS 3, 4, and 10 correspond to processing by the second selection operation detection unit 29, and STEPS 1, 2, 5 to 9, 11, and 12 correspond to processing by the display control unit 27.

According to the present embodiment, as described above, even if the display area of the display 2 is small, a selection operation of a hyperlink or the like in the screen may be performed easily and also the screen may be viewed swiftly.

While the temporary display scaling factor for selection operation is assumed to be two stages in the present embodiment, any number of stages may be set such as one stage or three or more stages.

While it is assumed in the present embodiment that the first selection operation is performed outside an area including a hyperlink, the first selection operation may be performed, for example, in an area including a hyperlink.

While it is assumed in the present embodiment that processing to cause a transition of the screen to a Web page linked to a hyperlink selected by the second selection operation is performed as a given processing, this may be applied when another processing is performed. For example, the given processing may be to display a detail screen of a menu selected by the second selection operation in the menu screen of the mobile phone 1.

Second Embodiment

Next, the second embodiment of the disclosed terminal apparatus and display control method will be described with reference to FIG. 5 and FIG. 6. The functional block diagram of a mobile phone in the present embodiment is the same as that in the first embodiment illustrated in FIG. 2 and the present embodiment is different from the first embodiment in processing (instead of the display scaling factor, the display position is changed as the display mode) by the controller 20. In the description that follows, the same reference numerals are attached to the same components as those in the first embodiment and a description thereof is omitted. A mobile phone in the present embodiment has a mail creation function and a function to select a pictogram from a pictogram list screen and to insert the pictogram into a mail (see FIG. 6 described below).

In the present embodiment, the first selection operation detection unit 28 detects that a double tap operation is performed in an area surrounding a pictogram on the touch panel of the display 2 when the pictogram list screen is displayed in the screen of the display 2 during execution of a pictogram input function for creating a mail. The second selection operation detection unit 29 detects that a pictogram is selected by a single tap operation (a single tap operation is performed in an area in which one of pictograms is displayed) on the touch panel of the display 2. The given processing corresponds to processing to input a selected pictogram into a mail being created.

Then, when a double tap operation is detected in the screen, the display control unit 27 adjusts the display position of the screen. The display control unit 27 sets a preset display reference position C stored in the nonvolatile memory 11 as a display reference position Y during execution of the pictogram input function for creating a mail. When a double tap operation is detected in the pictogram list screen displayed using the display reference position Y, the display control unit 27 sets, in the display reference position Y, a display reference position D in which the position in the screen corresponding to the input position of the double tap operation is the center of the display area of the display 2, generates a screen to be displayed using the display reference position Y, and displays the screen in the display 2.

Next, an operation of a mobile phone in the present embodiment will be described with reference to the flowchart in FIG. 5. It is assumed in the initial state that the mobile phone is turned on and the pictogram input function is activated when a mail is created. Also, an example of the display mode of the screen illustrated in FIG. 6 will be referenced below when appropriate. In the example in FIG. 6, the display reference position C of the screen is set in such a way that the lower left corner of the screen is at the lower left of the display area of the display 2.

Figure 5:
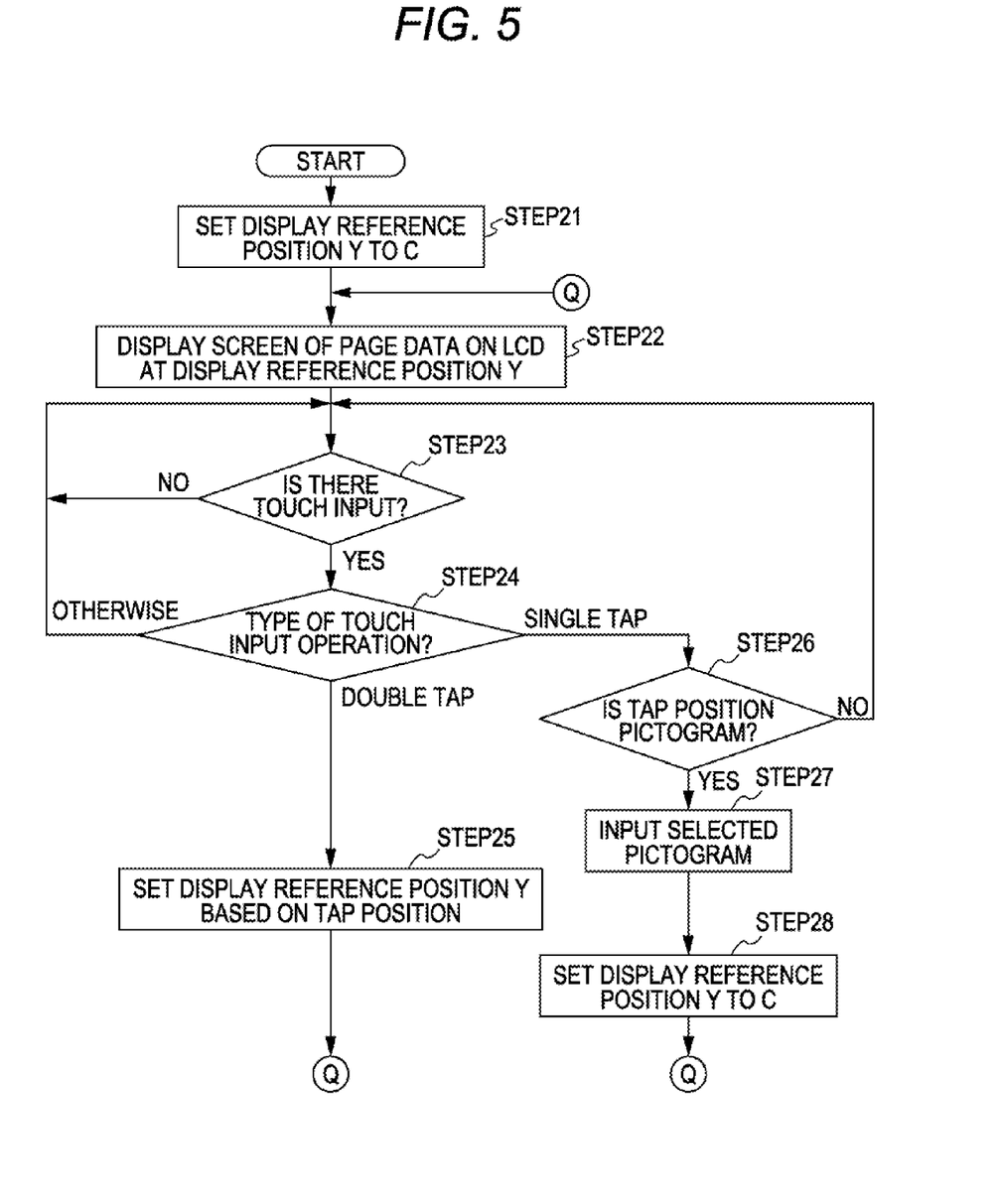
FIG. 5 is a flowchart illustrating display control processing of the mobile phone according to a second embodiment of the disclosed terminal apparatus.
Figure 6:
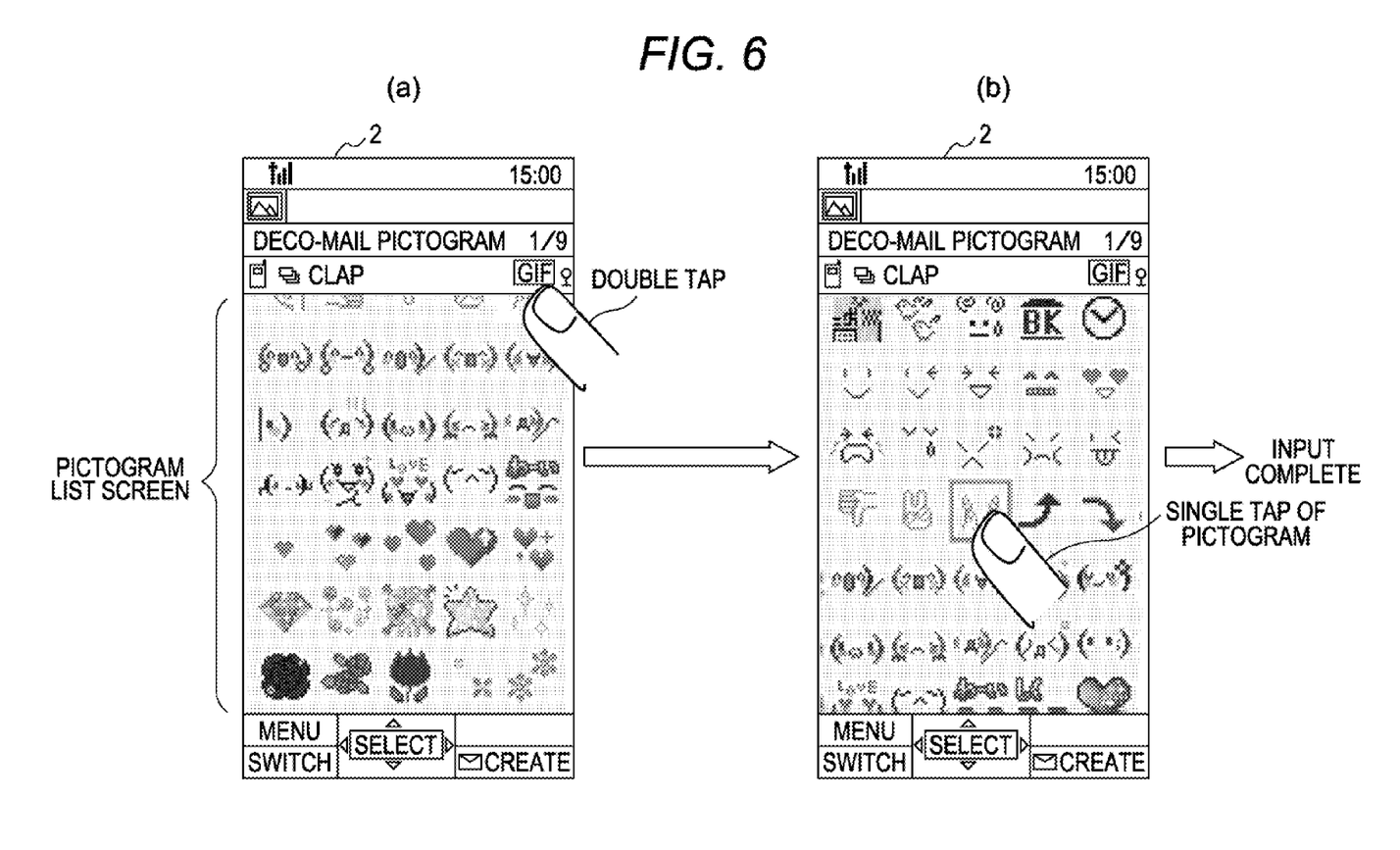
FIG. 6 is a diagram exemplifying the display mode of the screen of the mobile phone in FIG. 5.

FIG. 5 will be referenced. First at STEP 21, the controller 20 reads the preset display reference position C from the nonvolatile memory 11 and sets the display reference position C as the display reference position Y.

Next, at STEP 22, the controller 20 displays the pictogram list screen in the LCD screen of the display 2 using the display reference position Y. Accordingly, as illustrated in FIG. 6(a), the pictogram list screen is displayed using the lower left position as the reference position. At this point, due to, for example, too large a display scaling factor A preset by the user, the pictogram list screen may not stay in the display area and some pictograms, for example, the one at the upper right, are displayed only partially in a boundary portion of the display area of the screen.

Next, at STEP 23, the controller 20 determines whether any touch input has been done on the touch panel of the display 2 based on input information from the touch panel of the display 2. If the determination result at STEP 23 is NO, STEP 23 is repeated until the determination result at STEP 23 becomes YES, putting the touch panel into an input wait state.

If the determination result at STEP 23 is YES, the controller 20 proceeds to STEP 24 to determine the type of operation of touch input (whether a single tap operation, a double tap operation, or otherwise) based on input information from the touch panel of the display 2. If, as a result of determination at STEP 23, the type of operation is determined to be neither single tap nor double tap, the controller 20 returns to STEP 23 to wait for input of the touch panel.

If, as a result of determination at STEP 24, the type of operation is determined to be a double operation, the controller 20 proceeds to STEP 25 to set the display reference position D, in which the center of a pictogram closest to the input position of the double tap operation is the center of the display area of the display 2, as the display reference position Y before returning to STEP 22.

Then, at STEP 22, the controller 20 redisplays the pictogram list screen using the reference position Y. Accordingly, as illustrated in FIG. 6(a), if a double tap operation is performed near a pictogram (for example, a pictogram at the upper right) only partially displayed in the boundary portion of the display area to select the pictogram, as illustrated in FIG. 6(b), the pictogram is moved to the center of the display area so that the entire pictogram is displayed.

Then, if the user performs a single tap operation and, as a result of determination at STEP 24, the type of operation is determined to be a single tap operation, the controller 20 proceeds to STEP 26 to determine whether a pictogram in the screen is selected by the single tap operation. In this case, the display reference position Y is adjusted at STEP 25 by a double tap operation and, as illustrated in FIG. 6(b), a selection operation of the pictogram is made easier by a pictogram only partially displayed in the boundary portion of the display area being displayed in the center of the display area. If the determination result at STEP 26 is NO, the controller 20 returns to STEP 3 to wait for input of the touch panel. If the determination result at STEP 26 is YES, the controller 20 proceeds to STEP 27 to perform processing to input the selected pictogram.

At STEP 28, the controller 20 sets the display reference position Y as the preset display reference position C before returning to STEP 22.

Then, at STEP 22, the controller 20 displays the pictogram list screen using the display reference position Y. Accordingly, the pictogram list screen is displayed in the normal display reference position C and thus, the user is familiar with the display position and may swiftly view the pictogram list screen. When the user inputs one pictogram after another, the user may swiftly know the position of the next pictogram to be input.

The above is the display control processing performed by a mobile phone in the present embodiment. STEPS 23 and 24 correspond to processing by the first selection operation detection unit 28, STEPS 23 to 25 correspond to processing by the second selection operation detection unit 29, and STEPS 21, 22, 25 and 28 correspond to processing by the display control unit 27.

According to the present embodiment, as described above, even if the display area of the display 2 is small, a selection operation of a pictogram or the like in the screen may be performed easily and also the screen may be viewed swiftly.

While the display scaling factor is adjusted as the display mode in the first embodiment and the display position is adjusted as the display mode in the second embodiment, for example, the display scaling factor, display position and other display parameters may be adjusted together.

The display 2 is a touch panel in the first and second embodiments, but instead of assuming that the display 2 is a touch panel, the user may perform the first and second selection operations by moving the cursor displayed in the screen through key operations of the keypad.

A mobile phone is used as a terminal apparatus in the first and second embodiments, but a mobile terminal apparatus such as PDA or further, a terminal apparatus such as a PC may also be used.

According to the above terminal apparatus, display control method and program having the display function, even if the display area is small, a selection operation of a hyperlink or the like in the screen may be performed easily and also the screen may be viewed swiftly.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present inventions have been described in detail, it should be understood that the various changes, substitutions, and alterations could be made hereto without departing from the spirit and scope of the invention.

What is claimed is:

1. An apparatus comprising:
   a display;
   a display control unit configured to perform display control processing for displaying pages on the display;
   a first selection operation detection unit configured to detect that a first selection operation has been performed on a first page displayed on the display; and
   a second selection operation detection unit configured to detect that a second selection operation has been performed on the first page,
   wherein the display control unit performs display control processing for displaying the first page with a given scaling factor in a whole of a given area on the display, the first page includes a hyperlink to a second page,
   performs display control processing for changing a scaling factor of the first page from the given scaling factor to a changed scaling factor in the whole of the given area without changing a size of the given area based on detection of the first selection operation, and
   performs display control processing for displaying, after changing the scaling factor of the first page in the whole of the given area to the changed scaling factor in the whole of the given area, the second page with the given scaling factor in the whole of the given area based on detection of the second selection operation.

2. The apparatus according to claim 1, wherein the display control unit is capable of changing the scaling factor of the first page to any one of a plurality of given scaling factors and one of the plurality of given scaling factors is successively selected by consecutively performing the first selection operation.

3. A display control method for causing a display provided in an apparatus to display a plurality of pages, the display control method comprising:
displaying a first page, that includes a hyperlink to a second page, by changing a scaling factor of the first page from a given scaling factor to a changed scaling factor in a whole of a given area of the display without changing a size of the given area after detecting that a first selection operation has been performed in an area of the first page displayed on the display; and
opening, when detecting a second selection operation to the hyperlink in the first page for opening the second page instead of the first page, after a scaling factor of the first page has been changed from the given scaling factor to the changed scaling factor in the whole of the given area in response to a user operation for changing a scaling factor in the whole of the given area, the second page on the display so as to display the second page with the given scaling factor in the whole of the given area.

4. The display control method according to claim 3, further comprising:
accepting the first selection operation by a first selection operation unit that is arranged in a first area of the display; and
accepting the second selection operation by a second selection operation unit that is arranged in a second area of the display,
wherein a touch panel provided in the display is used as the first and second selection operation units.

5. The display control method according to claim 3, wherein consecutively performing the first selection operation is capable of changing the scaling factor of the first page to any one of a plurality of given scaling factors and one of the plurality of given scaling factors.

6. A non-transitory computer readable storage medium that stores a program for causing a computer to perform display control processing for displaying a plurality of pages on a display, wherein the program causes the computer to perform the processes of:
detecting that a first selection operation has been performed in an area of a first page, that includes a hyperlink to a second page, displayed on the display;
changing a scaling factor of the first page from a given scaling factor to a changed scaling factor in a whole of a given area on the display without changing a size of the given area based on detection of the first selection operation;
detecting that a second selection operation has been performed in an area of the first page; and
displaying the second page with the given scaling factor in the whole of the given area after detecting that the second selection operation has been performed in an area of the first page and after the scaling factor of the first page has been changed from the given scaling factor to the changed scaling factor in the whole of the given area.

7. The apparatus according to claim 1, wherein
the first selection operation includes a double tap operation performed in an area of the first page, and
the second selection operation includes a single tap operation performed in an area of the first page.

8. The display control method according to claim 3, wherein
the first selection operation includes a double tap operation performed in an area of the first page, and
the second selection operation includes a single tap operation performed in an area of the first page.

9. The non-transitory computer readable storage medium according to claim 6, wherein
the first selection operation includes a double tap operation performed in an area of the first page, and
the second selection operation includes a single tap operation performed in an area of the first page.

10. The apparatus according to claim 1, wherein
the display control unit performs the display control processing for changing the scaling factor of the first page so as to zoom in on the first page.

11. The display control method according to claim 3, wherein the changing changes the scaling factor of the first page so as to zoom in on the first page.

12. The non-transitory computer readable storage medium according to claim 6, wherein the changing changes the scaling factor of the first page so as to zoom in on the first page.

13. The apparatus according to claim 1, wherein the display control unit performs the display control processing for displaying the second page so as to open the second page at default size or in an overview.

14. The display control method according to claim 3, wherein the displaying the second page displays the second page so as to open the second page at default size or in an overview.

15. The non-transitory computer readable storage medium according to claim 6, wherein the displaying the second page displays the second page so as to open the second page at default size or in an overview.

16. An apparatus comprising:
a memory; and
a processor configured to, by executing a procedure in the memory,
display a first page with a given scaling factor in a whole of a given area on a touch panel, the first page including a hyperlink to a second page, and
open, when detecting a touch operation to the hyperlink in the first page for opening the second page instead of the first page, after a scaling factor of the first page has been changed from the given scaling factor to a changed scaling factor in the whole of the given area without changing a size of the given area in response to a user operation for changing a scaling factor in the whole of the given area, the second page on the touch panel so as to display the second page with the given scaling factor in the whole of the given area.

17. The apparatus according to claim 16, wherein the touch operation is a single tap operation.

18. The apparatus according to claim 16, wherein the first page and the second page are web pages.

* * * * *